United States Patent
Wurth et al.

(10) Patent No.: US 9,709,108 B2
(45) Date of Patent: Jul. 18, 2017

(54) ASSEMBLED SHAFT BRAKE DISK

(71) Applicant: Faiveley Transport Witten GmbH, Witten (DE)

(72) Inventors: Sebastian Wurth, Wipperfurth (DE); Andreas Mehlan, Unna (DE)

(73) Assignee: Faiveley Transport Witten GmbH, Witten (DE)

( * ) Notice: Subject to any disclaimer, the term of this patent is extended or adjusted under 35 U.S.C. 154(b) by 0 days.

(21) Appl. No.: 14/364,779

(22) PCT Filed: Nov. 13, 2012

(86) PCT No.: PCT/EP2012/072475
§ 371 (c)(1),
(2) Date: Jun. 12, 2014

(87) PCT Pub. No.: WO2013/087323
PCT Pub. Date: Jun. 20, 2013

(65) Prior Publication Data
US 2014/0339027 A1    Nov. 20, 2014

(30) Foreign Application Priority Data

Dec. 12, 2011    (DE) .................... 20 2011 052 267 U

(51) Int. Cl.
*F16D 65/12*    (2006.01)
*F16D 65/02*    (2006.01)

(52) U.S. Cl.
CPC ......... *F16D 65/123* (2013.01); *F16D 65/125* (2013.01); *F16D 65/128* (2013.01);
(Continued)

(58) Field of Classification Search
USPC ...... 188/217, 18 A, 218 XL, 218 A; 403/30, 403/408.1
See application file for complete search history.

(56) References Cited

U.S. PATENT DOCUMENTS 1,879,744 A    9/1932  Heiney
2,111,709 A *  3/1938  Halteren ................. F16D 65/10
                                                    188/218 R
(Continued)

FOREIGN PATENT DOCUMENTS

CN    1436286 A    8/2003
CN    101788029 A    7/2010
(Continued)

OTHER PUBLICATIONS

International Search Report for International application No. PCT/EP2012/072475, mailing date of Feb. 15, 2013.
(Continued)

*Primary Examiner* — Christopher Schwartz
(74) *Attorney, Agent, or Firm* — Kelly & Kelley, LLP

(57)  ABSTRACT

The invention relates to an assembled undular brake disc having a hub on which two friction rings which are produced from a steel material are arranged parallel to and spaced apart from one another. The assembled undular brake disc can withstand high mechanical loads and permits good internal ventilation. Supporting bolts for absorbing an axially acting pad contact pressure force are arranged between the friction rings.

14 Claims, 7 Drawing Sheets

(52) U.S. Cl.
CPC .............. *F16D 2065/1316* (2013.01); *F16D 2065/1328* (2013.01); *F16D 2065/1356* (2013.01); *F16D 2065/1388* (2013.01); *F16D 2065/1392* (2013.01); *F16D 2200/0021* (2013.01)

(56) References Cited

U.S. PATENT DOCUMENTS

| | | | |
|---|---|---|---|
| 3,509,973 A * | 5/1970 | Kimata Shigehiro | F16D 65/0006 164/98 |
| 3,554,075 A * | 1/1971 | Johnson | F16B 21/04 411/349 |
| 3,730,304 A * | 5/1973 | Buyze | F16D 65/128 188/218 XL |
| 4,036,334 A | 7/1977 | Brown | |
| 4,132,294 A * | 1/1979 | Poli | 188/218 XL |
| 4,177,883 A * | 12/1979 | Margetts | F16D 65/123 188/218 XL |
| 4,263,992 A | 4/1981 | Moore et al. | |
| 4,913,266 A * | 4/1990 | Russell et al. | 188/18 A |
| 5,085,295 A * | 2/1992 | Wautelet et al. | 188/73.2 |
| 5,150,774 A * | 9/1992 | Adamson | 188/218 XL |
| 5,429,381 A * | 7/1995 | Mercat | B62K 19/16 280/279 |
| 6,032,769 A * | 3/2000 | Daudi | 188/218 R |
| 6,098,764 A | 8/2000 | Wirth et al. | |
| 6,247,562 B1 | 6/2001 | Gotti et al. | |
| 6,564,913 B2 | 5/2003 | Baumgartner et al. | |
| 7,044,272 B2 * | 5/2006 | Takizawa | F16D 65/12 188/17 |
| 2004/0031651 A1 * | 2/2004 | Lehmann | F16D 65/12 188/218 XL |
| 2004/0178029 A1 * | 9/2004 | Hoyte et al. | 188/218 XL |
| 2006/0175160 A1 * | 8/2006 | Weiss | 188/218 XL |
| 2009/0038895 A1 * | 2/2009 | Snyder | F16D 65/12 188/166 |
| 2013/0043099 A1 * | 2/2013 | Kim | C22C 21/06 188/218 XL |

FOREIGN PATENT DOCUMENTS

| | | |
|---|---|---|
| DE | 1132950 | 7/1962 |
| DE | 1625827 A | 8/1970 |
| DE | 2110482 A1 | 9/1972 |
| DE | 2942151 A1 | 4/1981 |
| DE | 19507922 C2 | 4/1997 |
| DE | 29710533 U1 | 12/1997 |
| DE | 10104039 A1 | 8/2002 |
| DE | 10143817 * | 3/2003 |
| DE | 10358088 A1 | 7/2005 |
| DE | 202009007591 U1 | 8/2009 |
| EP | 1229266 A2 | 8/2002 |
| FR | 2745349 A1 | 8/1997 |
| FR | 2927389 A1 | 8/2009 |
| JP | S51-123476 A | 10/1976 |
| JP | H03-000333 A | 1/1991 |
| JP | 2000-097265 A | 4/2000 |
| JP | 2004-509300 A | 3/2004 |

OTHER PUBLICATIONS

German Search Report for German application No. DE 202011052267.9, mailing date of Jul. 13, 2012.
Office Action for Japanese Patent Application No. 2014-546385 mailing date of Feb. 25, 2016.
Patent Examination Report No. 1 for the Australian Patent Application No. 2012351030 date of issue Feb. 26, 2016.
Patent Examination Report No. 1 for the Australian Patent Application No. 2012351031 date of issue May 3, 2016.
Chinese Office Action for the Application No. 201280068541.7, issue date of Dec. 30, 2015.

* cited by examiner

ASSEMBLED SHAFT BRAKE DISK

FIELD OF INVENTION

The present invention relates to a built shaft brake disc having a hub, on which two friction rings are arranged parallel to and spaced from one another.

BACKGROUND OF THE INVENTION

Built shaft brake discs are employed in particular for rail vehicles, and through the built shape of the shaft brake discs these can be assembled from multiple individual components.

A built shaft brake disc is to mean a shaft brake disc which is put together of at least two components. Here, a built shaft brake disc is to describe in particular a brake disc that has two friction rings which are not formed in one piece and structure-uniformly with one another, for example as is known in a casting method, but which are individually provided and preferably assembled into a friction ring pair by further elements. As a further individual part, the hub in this case can be joined to the friction ring pair in the assembly.

Known are for example shaft brake discs having a hub, on which two friction rings are attached parallel to and spaced from one another. Between the friction rings, supporting pins or bolts can extend which are embodied to absorb axially acting pad contact pressure forces. In particular in the case of heavy rail vehicles, the pad contact pressure forces which are applied onto the friction ring pair by the brake linkage via the brake pads can reach very high values. From this results the requirement of embodying shaft brake discs with supporting pins or bolts arranged between the friction rings in a suitably stiff and mechanically highly loadable manner.

In addition to this, good heat removal is required and it is frequently provided that an airflow is generated which axially flows onto the shaft brake disc for example on the hub side and flows out radially on the outside. By way of this air throughput the brake disc can be cooled through heat convection and the airflow is generated through the rotation of the shaft brake disc about its axis of rotation. In particular in the case of cast shaft brake discs, casting geometries between the friction rings are known, which simulate the geometry of a radial fan, so that the corresponding air throughput by way of the shaft brake disc is obtained.

Substantially two types of ventilation are distinguished, the described radial ventilation type and a tangential ventilation type. If a shaft brake disc has supporting pins or bolts between the friction rings, these bring about a rather tangential ventilation. Through the rotation of the shaft brake disc the surface of the supporting pins or bolts is subjected to a tangential incident flow, as a result of which heat is discharged through convection. Here, the effect can be observed that the flow medium likewise slightly flows from the inner diameter to the outer diameter, as is also the case with the radial fan. However, this effect plays only a subordinate role so that substantially an axial airflow is obtained. Important here is an optimal arrangement and dimensioning of the supporting pins or bolts so that major heat dissipation is achieved.

In particular, built shaft brake discs are known as ceramic brake discs which comprises friction rings of a ceramic material, generally however of a material from the group of carbons. Frequently the hub of such non-metallic brake discs is produced from a steel material, and elaborate connecting geometries are required in order to avoid heat-induced distortions between the ceramic or carbon material and the metallic hub for receiving the friction rings.

PRIOR ART

From DE 195 07 922 C2 a built shaft brake disc is known, which comprises two friction rings which are arranged parallel to and spaced from one another on a hub, which friction rings can be flame-cut out of a plate in a simple manner. Between the friction rings is located a fan insert, which serves for improving the cooling on the inside of the friction rings. In order to receive axially acting pad contact pressure forces for the braking operation, the shown fan insert however is unsuitable and axial forces which are generated through the brake caliper via the brake pads onto the friction rings have to be absorbed via the connection of the friction rings to the hub. For this reason, a design of a shaft brake disc which has a rather lower mechanical load capacity is obtained.

From DE 195 43 799 A1 a further built shaft brake disc is known, and between friction rings produced from a material from the group of carbons supporting pins or bolts extend in order to absorb the high axially acting pad contact pressure forces. Here, the bolts are embodied with a collar, as a result of which pad contact pressure forces can be positively transmitted. Such a construction is known for built shaft brake discs with friction rings, which are produced of ceramics or a material from the group of the carbons. The built form of the shaft brake disc is used in particular because positively joined connections between the friction rings of a material from the group of carbons to a hub, which is produced from a steel material as a rule, cannot be used in a simple manner. Consequently, screw connections or other non-positively joined or positively joined connecting techniques are employed, wherein in the assembly joint between the friction rings and the hub frequently elements are additionally arranged which offset the different thermal expansion between the hub of a steel material and the friction rings of ceramics or a material from the group of the carbons, for example formed by slot nuts.

SUMMARY OF THE INVENTION

It is therefore the object of the present invention to provide a built shaft brake disc with friction rings of a steel material, which can withstand high mechanical loads and makes possible good internal ventilation. This object is solved with a built shaft brake disc, comprising a hub, on which two friction rings produced from steel material are arranged parallel to and spaced from one another, and supporting pins or bolts arranged between the friction rings for absorbing an axially acting pad contact pressure force.

The invention includes the technical teaching that the built shaft brake disc is constructed with a hub and two friction rings produced from a steel material, which are arranged parallel to and spaced from one another on the hub, wherein between the friction rings supporting pins or bolts for absorbing an axially acting pad contact pressure force are arranged.

Here, the friction rings can constitute a separate assembly that can be assembled independently of the hub and form a friction ring pair jointly with the supporting pins (or bolts). This assembly can then be connected to the hub by way of known methods, which hub in turn constitutes an independent component. Accordingly, friction ring and hub can be produced and provided independently of one another. This offers an advantage above all during the replacement of friction ring pairs on a hub.

The built shaft brake disc thus comprises multiple individual parts, which are formed at least by one hub, two friction rings produced from a steel material and a number of supporting pins. Similar to the construction of a ceramic or carbon brake disc, also known under the term carbon brakes, a shaft brake disc according to the invention can also be provided as a built brake disc, with which all functionally essential components consist of a steel material. In particular the friction rings can advantageously be cut out of a steel plate, for example by means of laser beam cutting, by means of water jet cutting or another thermal or abrasive cutting method, but the friction rings can also be mechanically cut out of a steel plate. The bolts can be produced from any materials, however preferentially also from steel. The hub in particular can be produced from steel in order to avoid heat expansion-induced distortions with a shaft, on which the shaft brake disc is mounted.

As a result, a built shaft brake disc is provided according to the invention which can be assembled from various materials in the manner of a modular system. In addition to the free material selection it is advantageous in addition that the geometry of the friction ring pair and/or the hub can be changed as desired. Because of this, the friction ring pair can be very rapidly adapted to changed peripheral conditions and differently embodied friction ring pairs can be mounted and demounted from a single hub through quick replacement.

However, the friction rings are formed in particular from a steel material, wherein at least in the case of the supporting pins a free material selection is made possible in order to optimise the individual components of the shaft brake disc with respect to their mechanical and thermal loads. Finally, the weight of the shaft brake disc can be further optimised since geometries can be employed which from a casting point of view cannot be produced strictly speaking.

Advantageously, the friction rings can comprise poles into which the supporting pins are inserted at the end side. The supporting pins can be designed rotation-symmetrically and have a middle portion and pins on the end side. During the assembly of the shaft brake disc, the pins of the supporting pins on the end side can be inserted into the holes in the friction rings. The length of the pins in this case determines the thickness of the shaft brake disc, which can for example be 80 mm.

The middle portion of the supporting pins can be larger than the diameter of the pins on the end side or the middle portion of the supporting pins is designed smaller than the diameter of the pins on the end side. In particular, it can be advantageous to provide supporting pins having a middle portion with a smaller diameter. This serves to accommodate the tolerance of the plates. In addition, inspection of the weld seam is possible. In addition, the thickness of the friction rings can be offset without additional mechanical machining being required.

The connection between the support bolts and the friction rings, in particular between the pins on the end side, which are inserted into the holes of the friction rings, can be produced through a press-fit connection, through a soldered connection, through a welded connection or through a riveted connection. Finally, a screw connection can also be advantageously produced using connecting screws. If the connection between the supporting pins and the friction rings consists of a soldered connection, this can be produced for example through high-temperature soldering or brazing. Here, soldering temperatures can be employed which do not occur during the normal operation of the brake disc.

If the connection between the supporting pins and the friction rings is produced through a welded connection, laser beam welding, electron beam welding or further possible welding methods can be employed here for example. Especially with the electron beam welding, the thermal input in the components to be joined is minimal, so that only a minimal thermal distortion through the welding method can develop in particular in the friction rings and which is why this method is to be advantageously employed. Through the materially joined connection it is advantageously achieved that the heat which develops in the friction rings through the operation of the shaft brake disc can be directed into the supporting pins so that the heat can be particularly effectively discharged through the internal ventilation.

With particular advantage, the soldered connection can be produced in a suitable oven, wherein at the same time the high-temperature soldering can be accompanied by a heat treatment for example of the friction rings. Through this connecting technology the advantage is obtained that with the connecting process, namely the high-temperature soldering, a hardening process of the further components, in particular of the friction rings, can also be created. Because of this, multiple advantages are achieved since an optimal material is created which is no longer changed in its material properties through subsequent machining or connecting operations and it can be achieved that by creating the connection in addition to the hardening in one operation a production advantage also in terms of cost is achieved.

It is also advantageous to arrange cooling elements between the friction rings, which are in particular welded or soldered onto the inside of the friction rings. Furthermore, the cooling elements can be screwed to the inside of the friction rings or soldered onto the end side.

The cooling elements increase the energy storing capacity of the brake disc. In the process, heat is directed from the friction ring into the cooling elements where it is discharged through convection. Thus, the convection surface is enlarged through the cooling elements, as a result of which more energy can be output to the flow medium.

In addition, the cooling elements can be configured so that these favour the cooling airflow through the shaft brake disc in that the cooling elements have for example a turbine blade-like shape. The cooling elements can be plate elements or alternatively or additionally a number of supporting pins can be arranged in addition to the cooling elements on the insides of the friction rings, but which have a length that is shorter than the supporting pins which extend between the two friction rings and connect these to one another. With the arrangement of the shortened supporting pins yet a further advantage is obtained to the effect that the arrangement of such shortened supporting pins can be effected for forming an optimal relationship of cooling capacity and dissipation and the geometry of the individual support pins can be selected with great freedom of design.

With additional advantage, the material of the cooling elements can be selected independently. Possible are steel and casting materials. In addition, however, non-ferrous metals such as aluminium or copper, or their alloys, can also be employed. The surface condition of the outer surface subjected to the incident flow can also be optimised with respect to thermal and flow-mechanical properties.

An inner row of supporting pins can be provided, which have axial passages, through which the connecting screws can extend. The connecting screws can for example be screwed into an internal thread, which is introduced into one of the friction rings, or screw nuts are provided, into which the connecting screws are screwed. In the case that the temperature loading is very high, the nut mounted onto the connecting screw on the end side can be formed as a sleeve and the thread decoupled from the temperature effect in this way. In addition, when using two sleeves installation space can be saved. Thus, the fastening ring, the friction rings and in particular the support bolts with the passages can be screwed together with full contact, as a result of which a particularly rigid connection between the friction rings and the hub is achieved. In this version, slot nuts are additionally employed.

On the hub, cams can be moulded on which, directed radially to the outside, extend between the friction rings and through which connecting screws are passed. Via the cams, the braking moment can thus be transmitted from the friction rings to the hub, wherein the cams can comprise recesses into which in turn slot nuts can be inserted, which can usually consist of hardened and tempered steel or cast iron. In particular, the slot nuts can have a minor radial mobility in the recesses of the cams in order to offset differences in the radial thermal expansion between the hub and the friction rings.

Furthermore, the friction rings can comprise protrusions facing radially to the inside, which can engage into recesses which are introduced in the hub. Thus a positive joint is achieved, in particular for transmitting the braking moments, which act from the friction rings on the hub.

Fastening rings can be provided, which on the outside contact the friction rings in the radial inner region. Here, connecting screws can extend through the fastening rings and at least through one part or a moulding of the hub, wherein in particular ceramic washers can be provided, which are arranged between the screw head of the connecting screws or between screw nuts on the connecting screws and the friction rings. Thus, a heat barrier is created, so that higher temperatures which can develop in the friction rings are not directly transmitted to the hub. The fastening rings additionally serve the purpose that the connecting screws cannot be subjected to bending distortion, wherein the fastening ring can be formed of a material which is characterized by a low expansion coefficient. Even by means of this a heat transfer from the friction rings to the hub can be minimised.

The positively-joined connection of friction rings and hub is suitable furthermore for a split version of the friction ring pair. To this end, the partition plane of the friction ring pair could be placed in the middle in the protrusions radially facing to the inside. Accordingly, a defined component of the centrifugal forces which act on the split friction ring pair could be transmitted to the hub via the cams. Accordingly, a possible partition screw connection of the two friction ring halves could be dimensioned smaller.

Finally, the use of a positively-joined connection makes possible the use of hub diameters which are larger compared with current connections. Since in this case the braking moment is transmitted via the positive joint of friction rings and hub, connecting elements, which in other embodiments transmit the braking moment, are omitted. Because of this, installation space can be saved which accordingly can be used for enlarging the hub diameter.

BRIEF DESCRIPTION OF THE DRAWINGS

Further measures improving the invention are shown in more detail in the following jointly with the description of preferred exemplary embodiments of the invention by means of the accompanying drawings, wherein.

Same reference characters of different exemplary embodiments mark same functioned components with slightly different features.

DETAILED DESCRIPTION OF THE PREFERRED EMBODIMENTS

Figure 1:
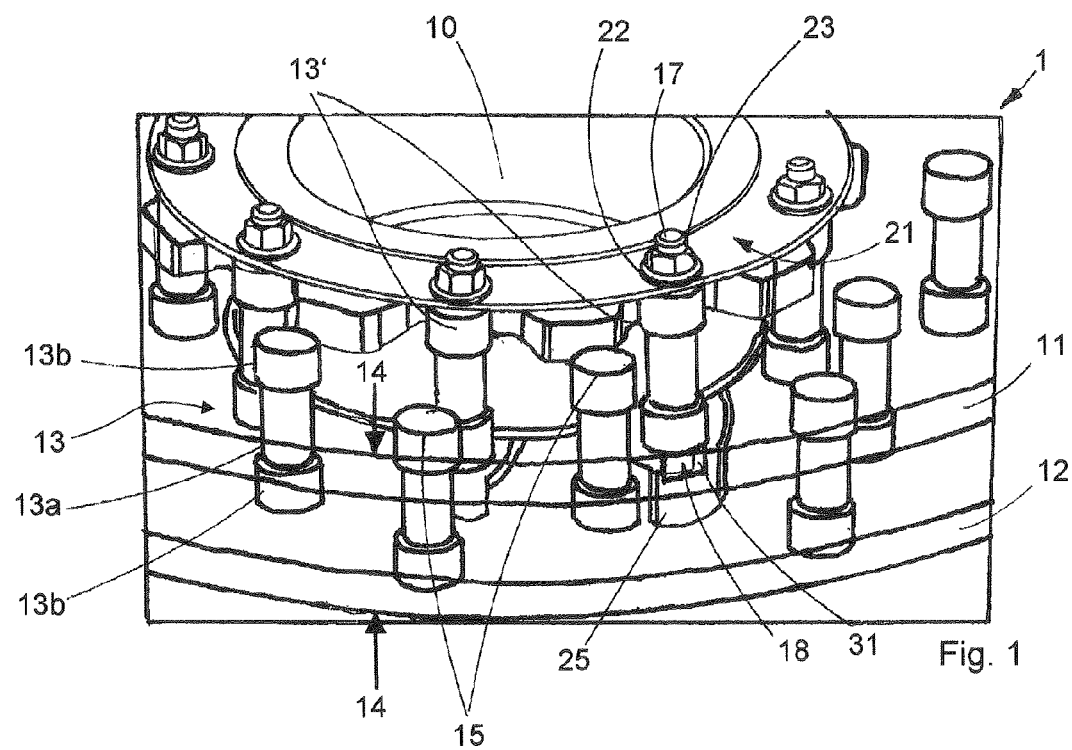
FIG. 1 a perspectively shown detail of a shaft brake disc according to a first exemplary embodiment in a partly-mounted state, FIG. 2 the exemplary embodiment of the shaft brake disc according to FIG. 1 in a mounted state, FIG. 3 the exemplary embodiment of the shaft brake disc according to FIGS. 1 and 2 with a friction ring pair mounted to a hub in a transversely sectioned view, FIG. 4 a perspective view of a friction ring of the exemplary embodiment of the shaft brake disc according to FIGS. 1 to 3 for forming a friction ring pair, FIG. 5 a perspective view of the hub of the exemplary embodiment of the shaft brake disc according to FIGS. 1 to 4, FIG. 6 a perspectively shown detail of a shaft brake disc according to a second exemplary embodiment, FIG. 7 the exemplary embodiment of the shaft brake disc according to FIG. 6 with a friction ring pair mounted to a hub in a cross-sectioned view, FIG. 8 a perspective view of a friction ring of the exemplary embodiment of the shaft brake disc according to FIGS. 6 and 7 for forming a friction ring pair, FIG. 9 a perspective view of the hub of the exemplary embodiment of the shaft brake disc according to FIGS. 6 to 8, FIG. 10 a perspectively shown detail of a shaft brake disc according to a third exemplary embodiment, FIG. 11 the exemplary embodiment of the shaft brake disc according to FIG. 10 with a friction ring pair mounted on a hub in a cross-sectioned view, FIG. 12 a perspective view of a friction ring pair of two friction rings of the exemplary embodiment of the shaft brake disc according to FIGS. 10 and 11, FIG. 13 a perspective view of the hub of the exemplary embodiment of the shaft brake disc according to FIGS. 10 to 12, and FIG. 14 a perspective view of a fastening ring with bolts arranged on the latter.

FIG. 1 shows a detail of an exemplary embodiment of a shaft brake disc 1 according to the invention with a hub 10, on which a first friction ring 11 and a second friction ring 12 arranged spaced from and parallel to the first friction ring 11 is arranged and which jointly form a friction ring pair. The shaft brake disc 1 can be employed in a brake system of a rail vehicle, and the friction rings 11 and 12 serve as friction partners for brake pads, which on the outside can be pressed onto the friction rings 11 and 12 with a brake caliper. Between the friction rings 11 and 12 multiple supporting pins (or bolts or dowels) 13 are arranged, which serve for absorbing the axially acting pad contact pressure forces 14 and prevent the deformation of the friction surfaces through static and dynamic screening. The friction rings 11 and 12 are produced from steel material and are cut out of a plate material through laser beam cutting or through water jet cutting.

The supporting pins 13 have a middle portion 13a and end-side pins 13b following the middle portion 13a on the end side. The end-side pins 13b can extend into the holes 15 in the friction rings 11 and 12 and for connection between the supporting pins 13 and the friction rings 11 and 12, the end-side pins 13b can be soldered, welded, glued or pressed into the holes 15.

The shown exemplary embodiment comprises supporting pins 13 with a middle portion 13a, which has a smaller diameter than the end-side pins 13b. The diameter jump allows a visual inspection of the same after application of a material joining method of the end-side pins 13b in the holes 15. Furthermore, the pins 13b are longer than the thickness of the plates used in order to absorb tolerances of these plates.

Figure 3:
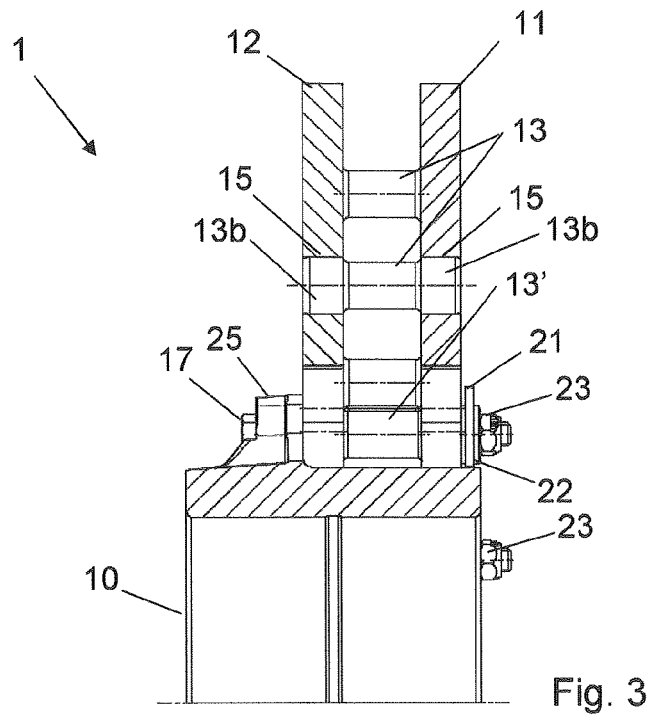

Furthermore, a further row of supporting pins 13' is shown, through which the connecting screws 17 are passed, and onto which end-side screw nuts 23 are screwed (detailed description see FIG. 3). Additionally screwed with the connecting screws 17 and the screw nuts 23 is a fastening ring 21, as a result of which the connecting screws 17 are not subjected to bending stress.

In the screw combination of the connecting screws 17, sliding blocks 18 are additionally provided which are inserted into slots 31 and the slots 31 are located in protrusions 25, which are moulded onto the hub 10. The sliding block 18 is produced from hardened and tempered steel and only has a negligible influence on the heat conductance between the friction rings 11, 12 and the hub 10.

In order to reduce a heat transfer between friction ring 11 and fastening ring 21, ceramic washers 22 of ceramic or fibre-reinforced ceramic materials are located between friction ring 11 and fastening ring 21. Alternatively, the fastening ring can be produced from steel which has a low heat expansion coefficient.

Figure 2:
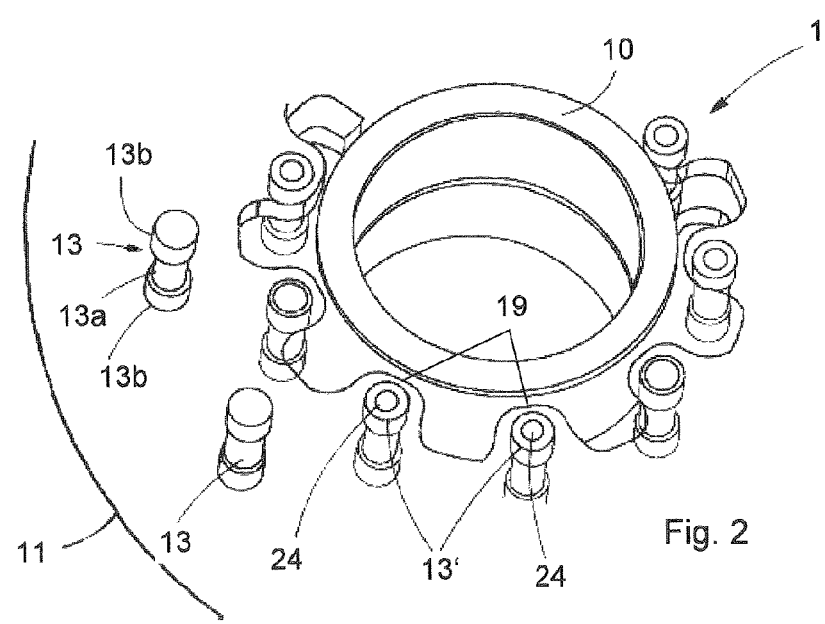

FIG. 2 shows a further perspective view of the shaft brake disc 1 with the hub 10 according to FIG. 1, wherein the inner row of supporting pins 13' is shown, which are formed with axial passages 24, through which the connecting screws 17 shown in FIG. 1 can be passed. Here it is shown that the friction ring 11 comprises protrusions 19 facing radially to the inside, into which the supporting pins 13' with the passages 24 project, so that a fixed connection between the supporting pins 13' and the friction ring 11 can be created when the connecting screws 17 are passed through the axial passages 24. A further row of supporting pins 13 shows an embodiment of the supporting pins 13 with a middle portion 13a, which has a smaller diameter than the end-side pins 13b of the supporting pins 13, which are connected to the friction rings 11 and 12, wherein the friction ring 12 can have protrusions 19 in the same manner as the friction ring 11, and the supporting pins 13' extend with their opposite end into the protrusions 19 of the friction ring 19 which is not shown in more detail.

FIG. 3 shows the exemplary embodiment of the shaft brake disc 1 according to the FIGS. 1 and 2 in a cross-sectioned view. The cross section shows the hub 10 with protrusions 25 radially directed to the outside, of which in the cross-sectional view a protrusion 25 is visible. On the protrusions 25, the friction ring pair of the friction rings 11 and 12 is connected to the hub 10 in a torque-transmitting manner. For connecting the friction rings 11 and 12, connecting screws 17 are provided, which extend through holes in the protrusions 25. Furthermore, the connecting screws 17 extend through supporting pins 13' with respective passages, and on the side located opposite the screw head of the connecting screw 17 screw nuts 23 are screwed onto the connecting screws 17. Consequently, the protrusion 25, the friction rings 11 and 12 as well as the supporting pins 13' are screwed together "with full contact" by way of the connecting screws 17. Below the screw nuts 23 is located a fastening ring 21, wherein between the fastening ring 21 and the screw nuts 23 ceramic washers 22 are shown. Furthermore, supporting pins 13 are shown which extend between the friction rings 11 and 12, and which are embodied solid without through-bore and extend with their end-side pin 13b into the holes 15 in the friction rings 11 and 12. The shown arrangement advantageously makes possible a removal of the friction ring pair of the friction rings 11 and 12 with the supporting pins 13 from the hub 10 by simply loosening the connecting screws 17. For example, an exchange of a warm friction ring pair can thus be performed in a simple manner and dependent on the installation situation of the shaft brake disc 1, the hub 10 need not be removed from a shaft in order to replace the friction ring pair with the friction rings 11 and 12.

Figure 4:
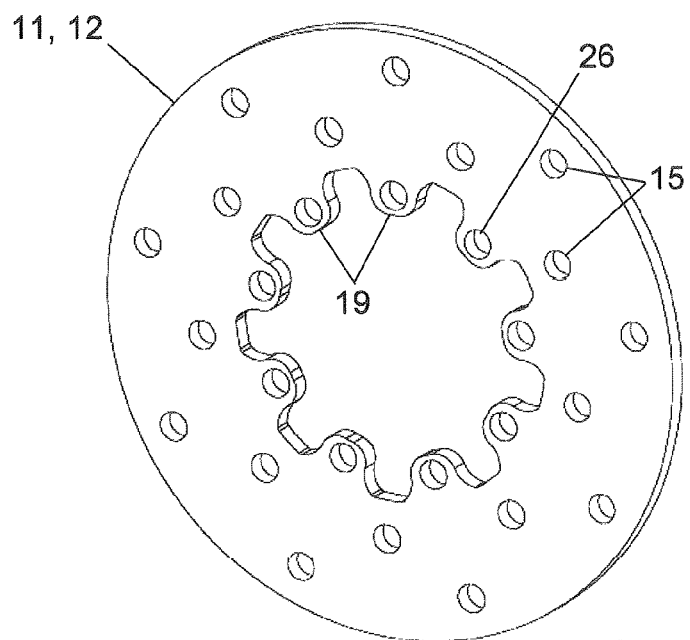

FIG. 4 shows a friction ring 11 and 12 respectively in a perspective view. The friction ring 11 and 12 respectively can be cut out of a plate material of suitable thickness through a thermal cutting method, for example through laser beam cutting. With laser beam cutting, oxygen is suitable in particular as cutting gas. Likewise, an abrasive cutting method can be employed, for example water jet cutting. On the flat friction surface of the friction ring 11 and 12 respectively, holes 15 are shown into which the supporting pins 13 with their end-side pins 13b can be inserted. On the inside, the friction ring 11 and 12 respectively comprises protrusions 19 which radially face to the inside, in which through-bores 26 are introduced and through which the connecting screws 17 can be passed. The friction ring 11 and 12 respectively is placed on the hub 10 with a radial orientation, in which orientation the protrusions 19 of the friction rings 11, 12 are in alignment with the cams 25 of the hub 10.

Figure 5:
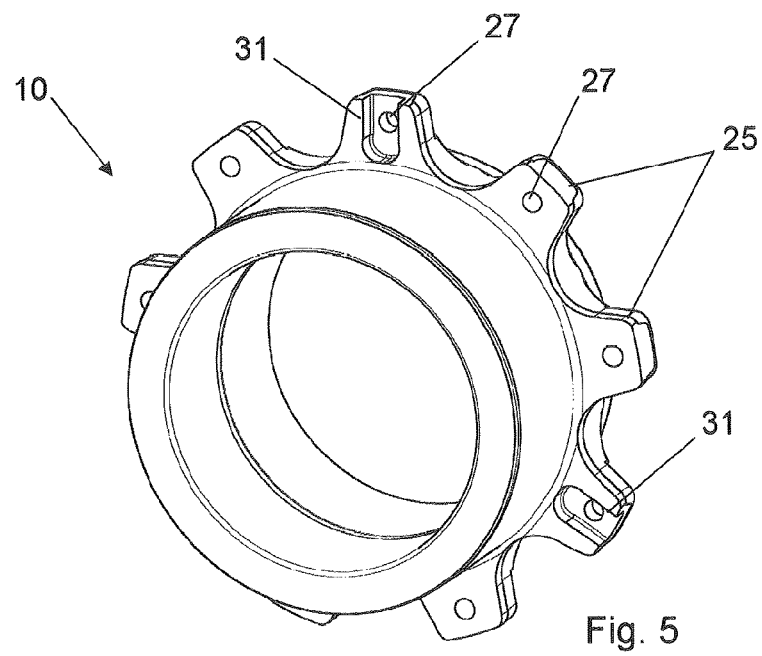

FIG. 5 finally shows a hub 10 in a perspective view, which comprises multiple protrusions 25 on its outer circumference. In the protrusions 25, through-bores 27 are introduced through which the connecting screws 17 can extend and which are in alignment with the through-bores 26 in the friction rings 11 and 12 and with the axial passages 24 in the supporting bores 13'. In some of the protrusions 25, slots 31 are introduced into which the sliding blocks 18 shown in FIG. 1 can be inserted.

Figure 6:
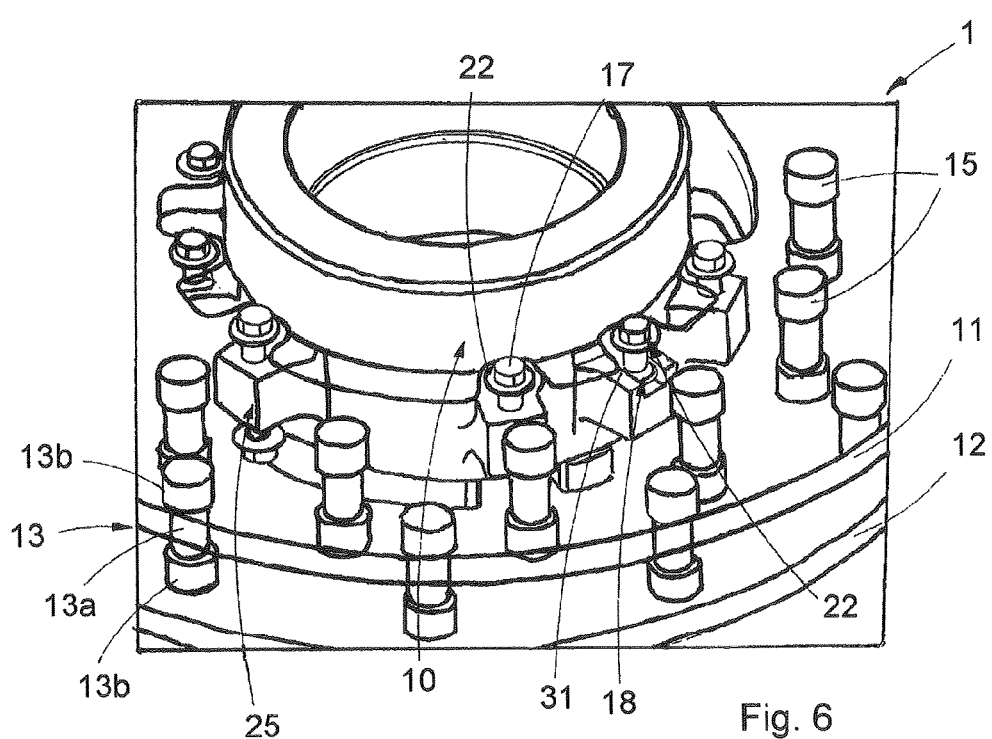

FIG. 6 shows a further exemplary embodiment of a shaft brake disc 1 with a hub 10, which comprises cams 25 which are formed radially to the outside. The cams 25 comprise passages through which the connecting screws 17 are guided so that a connection with the friction ring 11 is created, through which the connecting screws 17 likewise extend. Below the heads of the connecting screws 17 in turn ceramic washers 22 are arranged, and in the cams 25 of the hub 10 milled slots 31 are introduced, into which the sliding blocks 18 are inserted. The slots 31 can also be milled into the friction surfaces. If the slots 31 are milled into the cams 25 of the hub 10 a tool is required which corresponds at least to half the height of the hub. In this exemplary embodiment, too, supporting bores 13 are shown which have a middle portion 13a with a smaller diameter and end-side pins 13b with a larger diameter, and the supporting pins 13 are connected to the friction rings 11 and 12 with the end-side pins 13b.

Figure 7:
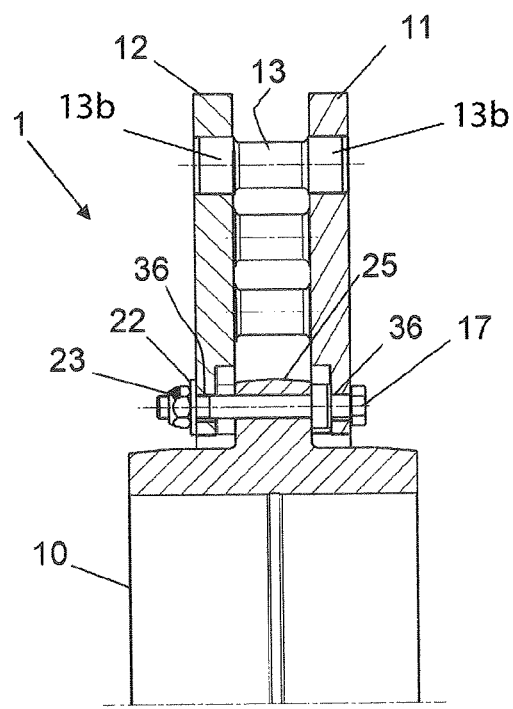

FIG. 7 shows a cross-sectioned view through the shaft brake disc 1 according to the exemplary embodiment from FIG. 6. The shaft brake disc 1 comprises a friction ring pair of the friction rings 11 and 12, which have supporting pins 13, which extend between the friction rings 11 and 12. In order to fasten the friction ring pair of the friction rings 11 and 12 to the hub 10, the hub 10 comprises cams 25 which extend radially to the outside. Through the cams 25, connecting screws 17 can be passed which extend equally through bores 36 in the friction rings 11 and 12. When the screw nut 23 is screwed onto the free end of the connecting screw 17, the friction rings 11 and 12 can be screwed to the cams 25 of the hub 10 "with full contact", wherein the cams 25 are located between the friction rings 11 and 12. In this exemplary embodiment, too, a ceramic washer 22 under the screw nut 23 is shown. If the friction ring pair of the friction rings 11 and 12 is to be removed from the hub 10, the connecting screws 17 can be removed in order to subsequently easily turn the hub 10 relative to the friction ring pair. Thus, the cams 25 can be axially passed through the recesses 28 in order to remove the friction ring pair from the hub 10 without having to remove the two friction rings 11 and 12 from one another.

Figure 8:
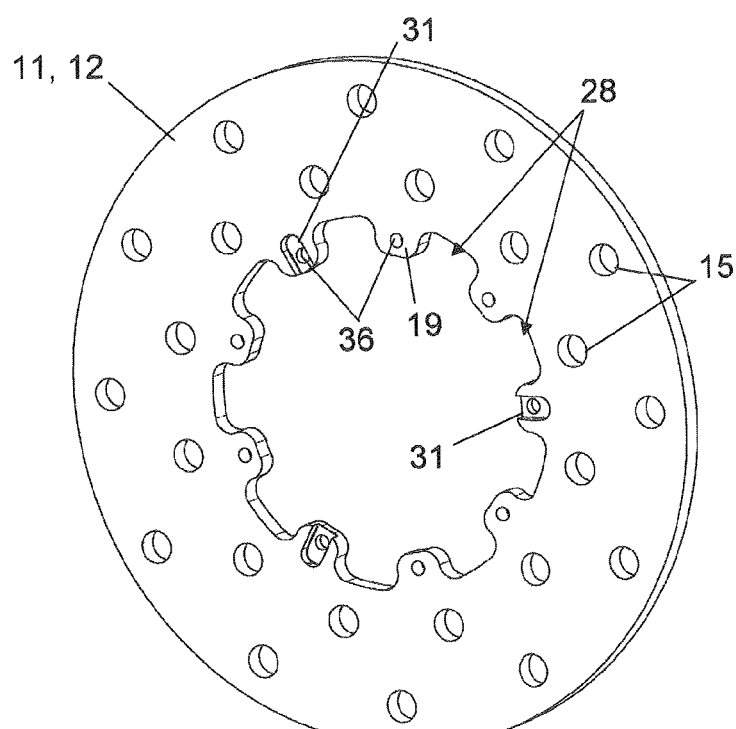

FIG. 8 represents a perspective view of the friction rings 11 and 12 respectively, in which a multitude of holes 15 for receiving the supporting pins 13 is introduced. The bores 36 in the friction rings 11 and 12 for passing through the connecting screws 17 are introduced in protrusions 19 radially facing to the inside, between which the recesses 28 extend. In some of the protrusions 19, slots 31 for receiving sliding blocks 18 are milled, as already shown in FIG. 6 in the assembled state.

Figure 9:
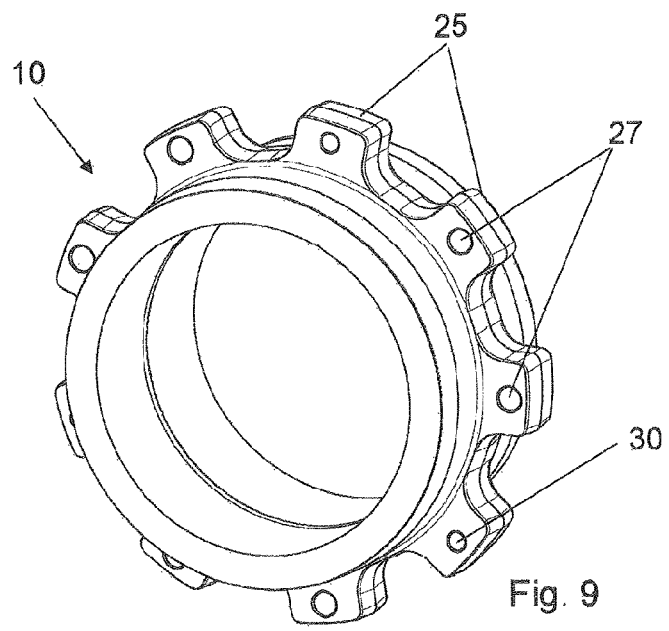

Finally, FIG. 9 shows a perspective view of the hub 10 according to the exemplary embodiment from FIG. 6 with cams 25 projecting radially to the outside, into which through-bores 27 are introduced, through which the connecting screws 17 can be passed (see FIG. 7). The through-bores 27 can be provided as through-bore for passing through simple connecting screws 17 with a threaded shank, and through the through-bores 30, which correspond to the slots 31 introduced into the friction rings 11 and 12 for receiving the sliding blocks 18, cylinder pins can be passed in order to create a corresponding tolerance dimension between the hub 10 and the friction ring pair and to transfer the fit to the friction ring pair via the sliding blocks 18. The through-bores 30 for passing through the cylinder pins can for example have a larger diameter than the through-bores 27 for passing through simple connecting screws 17.

Figure 10:
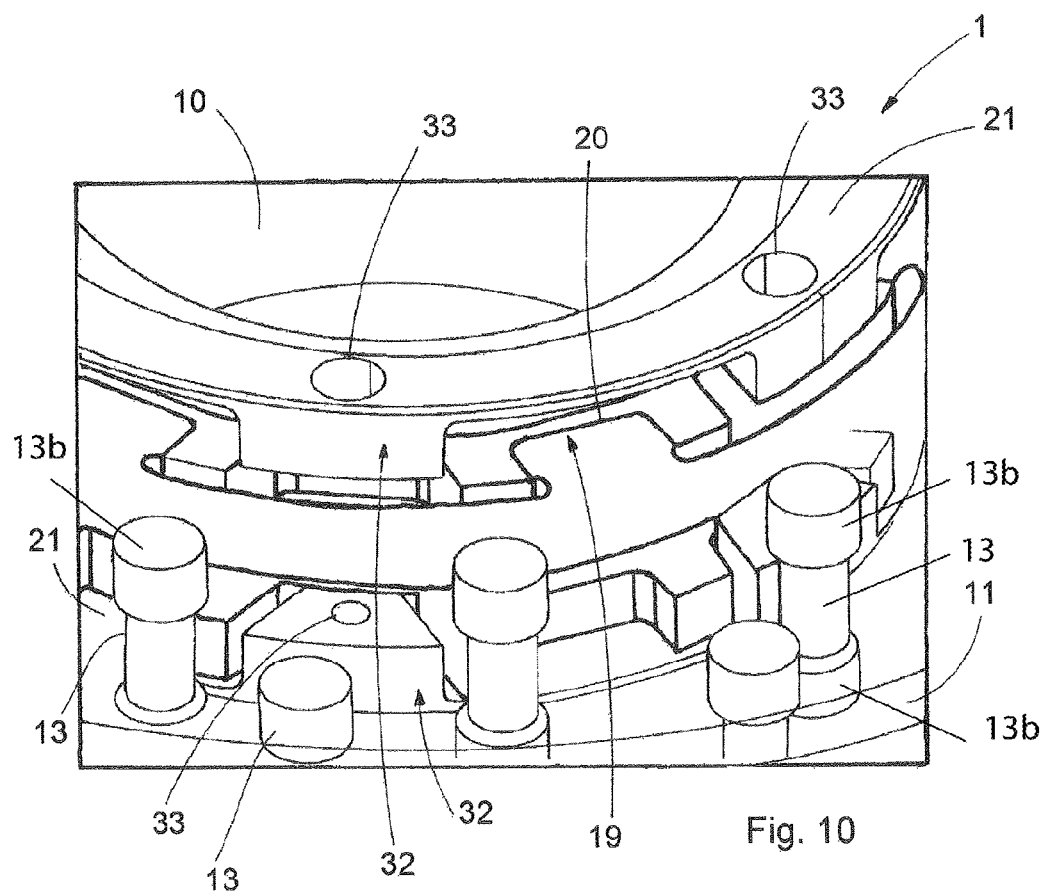

FIG. 10 shows the hub 10 in a further embodiment of the shaft brake disc 1 with recesses 20, into which the protrusions 19 of the friction rings 11 and 12 are inserted. The protrusions 19 face radially to the inside and the pocket-like recesses 20 enclose the protrusions 19 of the friction rings 11 and 12 (friction ring 12 is not shown in the perspective). Furthermore, supporting a pins 13 are shown which extend between the friction rings 11 and 12.

A row of the pocket-like recesses 20 is closed in axial direction. Because of this, a degree of freedom of movement of the friction ring pair 11, 12 in an axial direction is blocked. For the complete axial fixing, a fastening ring 34, see FIG. 14, with welded-on or soldered-on threaded pins 35, which are passed through bores 36 in the protrusions 19 of the friction rings 11, 12 and the closed part of the hub 10, is screwed against the back of the pocket-like recesses 20. This ensures at the same time that upon breaking-out of a part of the friction ring 11, 12 the latter is locked through the threaded pin.

Alternatively, a flat fastening ring 21 can be directly screwed to the cams 25 of the hub 10. As a thread safeguard, a self-locking thread or so-called screw lock threaded inserts can be used.

To axially secure the friction rings 11 and 12, fastening rings 21 are shown, which are exemplarily embodied with axial protrusions 32, and through holes 33 in the fastening rings 21 screw elements can be passed in order to screw the fastening rings 21 to one another. Here, the axial protrusions 32 of the fastening rings 21 can be axially pressed onto one another or by screwing the fastening rings 21 together the latter can be at least axially clamped to one another. Thus, the friction rings 11 and 12 are axially locked and the torque of the friction rings 11 and 12 can be transmitted to the hub 10 via the protrusions 19 in the recesses 20.

Figure 11:
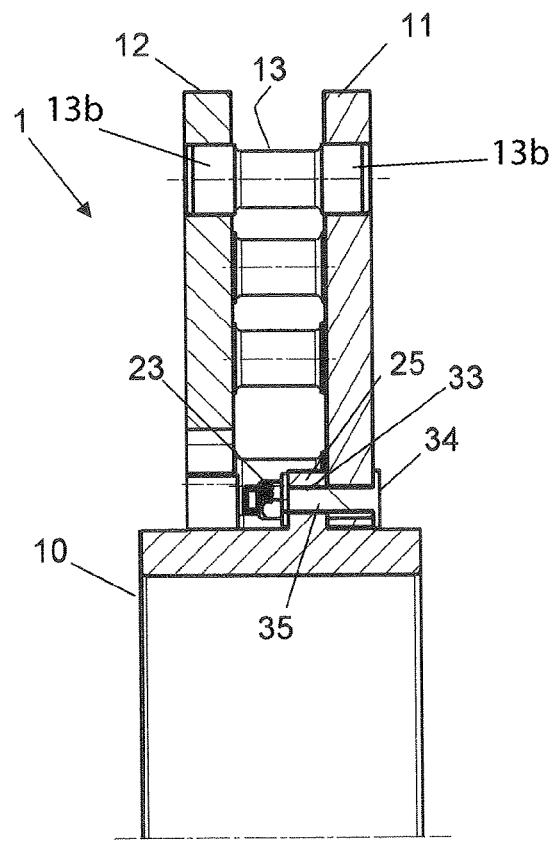

FIG. 11 shows the exemplary embodiment of the shaft brake disc 1 according to FIG. 10 in a cross-sectioned view. Shown is the connection between the hub 10 and the friction ring pair of the friction ring 11 and 12, between which the supporting pins 13 extend. The hub 10 comprises cams 25, into which holes 33 are introduced. Through holes 33 in one of the friction rings 12 and through the holes 33 in the cams 25 on the hub 10, threaded pins 35 can be passed which are located on a fastening ring 34. At the end side on the threaded bolts 35, screw nuts 23 are screwed on in order to connect the friction ring pair to the hub 10 via one of the friction rings 12.

Figure 12:
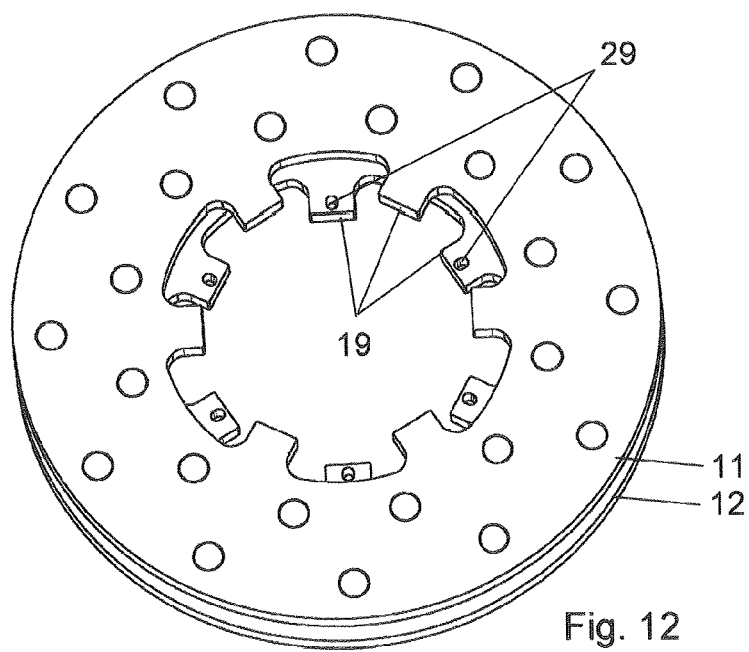

FIG. 12 shows the friction ring pair of the friction rings 11 and 12, wherein in the lower friction ring 12 bores 29 are introduced through which the threaded pins 35 of the fastening ring 34 can be passed. The bores 29 are introduced into protrusions 19 in the friction ring 12 which radially extend to the inside. The protrusions 19 of the friction ring 11 are offset with respect to the protrusions 19 of the friction ring 12 by an angle of for example 30°, so that accessibility of the screw nut 23 is ensured, see FIG. 11 in this respect.

Figure 13:
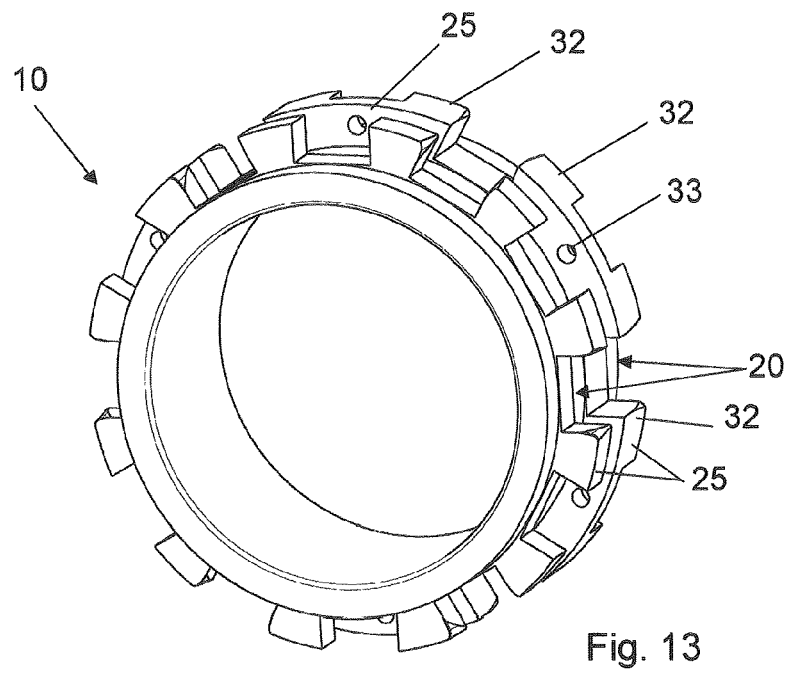

FIG. 13 perspectively constitutes a hub 10 according to the exemplary embodiment from FIG. 10. On the hub 10, multiple cams 25 radially extend to the outside, which partly have axial protrusions 32, between which intermediate spaces are formed, into which the protrusions 19 of the friction rings 11 and 12 can engage. Thus, the braking moment can be transmitted between the cams 25 and the protrusions 19 via the positively joined connection and the screw connection of the friction ring 12 to the hub 10 via the threaded pins 35 of the fastening ring 34 merely serves to axially secure the friction ring pair on the hub 10. Additionally shown are holes 33 in the cams 25, through which the threaded pins 35 of the fastening ring 34 can be passed.

Figure 14:
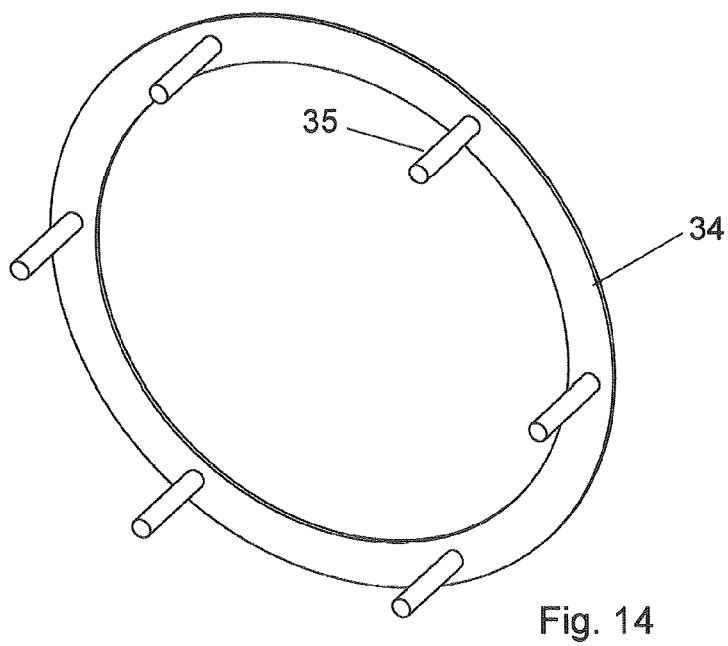

FIG. 14 finally shows a perspective view of the fastening ring 34 with multiple threaded pins 35 axially located on said fastening ring 34. Thus, the use of the fastening ring 34 with respect to the fastening ring 21 in FIG. 10 constitutes a further alternative for connecting the friction ring pair to the hub 10.

In its embodiment, the invention is not restricted to the preferred exemplary embodiment stated above. A number of variants is rather conceivable which makes use of the shown solution even with fundamentally different types of embodiments. All features and/or advantages arising from the claims, the description or the drawings including design details or spatial arrangements can be substantial to the invention both by themselves as well as in a wide range of combinations.

The invention claimed is:

1. A shaft brake disc which is put together of at least two components, comprising:
    a hub, on which two friction rings produced from steel material are arranged parallel to and spaced from one another; and
    supporting pins arranged between the friction rings for absorbing an axially acting brake pad contact pressure force, wherein the supporting pins are designed rotation-symmetrically with respect to their longitudinal axis and have a middle portion and end-side pins, wherein the middle portion has a smaller diameter than the end-side pins, wherein a connection between the supporting pins and the friction rings is formed through a press-fit connection or through a materially joined connection, wherein the friction rings are arranged on the hub through a non-positively joined and a positively-joined connection, wherein the friction rings are connected to the hub by means of sliding blocks and connecting screws, wherein at least one fastening ring is provided, which on the outside abuts the friction rings in a radial inner region, wherein the connecting screws extend through the fastening ring and at least through a part or a moulded-on portion of the hub.

2. The shaft brake disc according to claim 1, wherein the connection between the supporting pins and the friction rings is formed through a soldered connection, through a welded connection, through a riveted connection and/or through a screw connection with connecting screws.

3. The shaft brake disc according to claim 2, wherein the soldered connection is produced through high-temperature soldering and/or wherein the welded connection is produced through laser beam welding or through electron beam welding.

4. The shaft brake disc according to claim 1, wherein the friction rings comprise holes, into which the supporting pins are inserted on an end side.

5. The shaft brake disc according to claim 1, wherein cooling elements are arranged between the friction rings, wherein said cooling elements are welded on or soldered on the inside of at least one of the friction rings.

6. The shaft brake disc according to claim 1, wherein the friction rings have protrusions radially facing to the inside, which engage into recesses which are introduced into the hub.

7. The shaft brake disc according to claim 1, including an inner row of supporting bolts which have axial passages, through which the connecting screws extend.

8. The shaft brake disc according to claim 1, including cams moulded onto the hub, which extend directed radially to the outside between the friction rings and through which the connecting screws are passed.

9. The shaft brake disc according to claim 1, including ceramic washers arranged between the screw head of the connecting screws and/or between screw nuts on the connecting screws and the friction rings.

10. A shaft brake disc which is put together of at least two components, comprising:
 a hub, on which two friction rings produced from steel material are arranged parallel to and spaced from one another; and
 supporting pins arranged between the friction rings for absorbing an axially acting brake pad contact pressure force,
wherein the supporting pins are designed rotation-symmetrically with respect to their longitudinal axis and have a middle portion and end-side pins, wherein the middle portion has a smaller diameter than the end-side pins, and wherein a connection between the supporting pins and the friction rings is formed through a press-fit connection or through a materially joined connection;
 wherein the connection between the supporting pins and the friction rings is formed through a soldered connection, through a welded connection, through a riveted connection or through a screw connection with connecting screws; and
 wherein the soldered connection is produced through high-temperature soldering or wherein the welded connection is produced through laser beam welding.

11. A shaft brake disc which is put together of at least two components, comprising:
 a hub, on which two friction rings produced from steel material are arranged parallel to and spaced from one another; and
 supporting pins arranged between the friction rings for absorbing an axially acting brake pad contact pressure force,
 wherein the supporting pins are designed rotation-symmetrically with respect to their longitudinal axis and have a middle portion and end-side pins, wherein the middle portion has a smaller diameter than the end-side pins, and wherein a connection between the supporting pins and the friction rings is formed through a press-fit connection or through a materially joined connection; and
 at least one fastening ring, which on the outside abuts the friction rings in the radial inner region, wherein connecting screws extend through the fastening ring and at least through a part or a moulded-on portion of the hub.

12. The shaft brake disc according to claim 11, including an inner row of supporting bolts which have axial passages, through which the connecting screws extend.

13. The shaft brake disc according to claim 11, including cams moulded onto the hub, which extend directed radially to the outside between the friction rings and through which the connecting screws are passed.

14. The shaft brake disc according to claim 11, including ceramic washers arranged between the screw head of the connecting screws and/or between screw nuts on the connecting screws and the friction rings.

* * * * *